US005929748A

United States Patent [19]
Odinak

[11] Patent Number: 5,929,748
[45] Date of Patent: Jul. 27, 1999

[54] AUTOMATED HOME CONTROL USING EXISTING ELECTRICAL LINES AS A COMMUNICATIONS MEDIUM

[75] Inventor: Gilad Odinak, Bellevue, Wash.

[73] Assignee: Microsoft Corporation, Redmond, Wash.

[21] Appl. No.: 08/874,045

[22] Filed: Jun. 12, 1997

[51] Int. Cl.$^6$ .................................................. H04M 11/04
[52] U.S. Cl. .............................. 340/310.01; 340/310.02; 340/310.06
[58] Field of Search ........................ 340/310.01, 310.02, 340/310.06

[56] References Cited

U.S. PATENT DOCUMENTS

| | | | |
|---|---|---|---|
| 3,911,415 | 10/1975 | Whyte | 340/310.01 |
| 4,757,495 | 7/1988 | Decker et al. | 370/76 |
| 5,263,046 | 11/1993 | Vander Mey | 375/1 |
| 5,327,230 | 7/1994 | Dockery | 348/8 |
| 5,355,114 | 10/1994 | Sutterlin et al. | 340/310.01 |
| 5,452,344 | 9/1995 | Larson | 340/310.01 |
| 5,592,482 | 1/1997 | Abraham | 348/8 |
| 5,777,769 | 7/1998 | Coutinho | 340/310.01 |

FOREIGN PATENT DOCUMENTS 0 580 457 A1  5/1993  European Pat. Off. .

WO 95/19070  7/1995  WIPO .

OTHER PUBLICATIONS

Thomas E. O'Brien Jr., "Physical and Media Specifications of the CXBus", IEEE Transactions on Consumer Electronics, Aug. 1991. No. 3, pp. 357–366.

*Primary Examiner*—Edward Lefkowitz
*Attorney, Agent, or Firm*—Lee & Hayes, PLLC

[57] ABSTRACT

A home control system as described herein uses existing electrical power lines in a home for communications. A system includes one or more analog signal sources connected to transmit analog signals using high-bandwidth frequency channels on the electrical power lines, at relatively high bandwidths. The analog signal sources receive control data using a low-bandwidth frequency channel on the same electrical power lines, at a comparatively low bandwidth. One or more analog signal receivers are connected to receive the analog signals using the high-bandwidth frequency channels, and to receive control data using the low-bandwidth frequency channel. A controller is configured to designate one or more source/ receiver groups from the analog signal sources and receivers. The controller is connected to send control data to the source and receiver of each group using the low-bandwidth frequency channel. The control data instructs each group to use a different one of the high-bandwidth frequency channels.

28 Claims, 4 Drawing Sheets

AUTOMATED HOME CONTROL USING EXISTING ELECTRICAL LINES AS A COMMUNICATIONS MEDIUM

TECHNICAL FIELD

This invention relates to automated home control systems and to methods of communicating between distributed components of a home control system using existing electrical wiring in a house or other building.

BACKGROUND OF THE INVENTION

A modern home potentially has a great number of sophisticated electrical systems, including security systems, audio/video systems, telephone systems, intercom systems, etc. All of these systems require interconnecting wiring. A security system for example, requires wiring between sensors, controllers, and alarm devices. Audio/video systems require a maze of wiring between different active components, as well as wiring to as many as six speakers in a single room. Telephone and intercom systems similarly require wires between stations.

When systems such as these are installed during construction of a new home, wiring can be installed with little trouble. When adding systems to an existing house, however, installation of required wiring often requires significant effort.

Because of the difficulty of installing interconnecting wiring in an existing home, there are many available products that utilize existing AC power distribution wires or lines in a house for communications of various types. Products such as these work by modulating a signal on the power lines at a frequency that is well above the conventional 60 Hz frequency of electrical power carried by the distribution lines.

The so-called "X10" protocol is popular for providing simple communications between common electrical components such as security components, switchable power receptacles, dimmers, and other power control modules. The X10 system provides basic functionality between command modules and receivers of various types. In general, however, this system is limited to on/off and dimming capabilities.

A variety of other products are also available. Some home intercoms, for example, modulate an analog audio signal on the power lines to provide audio communications between two different rooms in a house, without requiring dedicated wiring. Extension telephones are available that utilize existing power lines rather than requiring the installation of telephone cable. Adapters are also available for transmitting video and stereo audio over existing power lines in a house.

There are a number of different protocols used for communications over existing building wiring. The relatively simple X10 communications protocol is one example. An X10 signal is composed of a series of 5 volt, 121 kHz pulses having a duration of 1 millisecond, positioned at zero crossings of the 60 Hz AC power signal. Each pulse corresponds to a binary 1, and the absence of a pulse corresponds to a binary 0. A single X10 command consists of a 22 bit word obtained from eleven complete cycles of the AC power signal.

All X10 receivers plugged into the household power lines will see all transmitted signals. However, each command carries the address of its transmitter. A receiver responds to only those commands that have the address of the receiver. Thus, control modules such as switch modules can be paired with receiver modules by manually setting both addresses to the same value. Up to 256 addresses are available. Computer interfaces are available for allowing a computer to issue commands to different X10 receivers over home power lines.

More sophisticated protocols have also been used to communicate using existing power lines. Electrical protocols in most such systems use a modulation carrier that is significantly higher in frequency than 60 Hz. Data formatting in the more sophisticated systems is similar or identical to networking protocols, in which discrete packets of digital information are sent from an originating device to a destination device using a common carrier channel or frequency. To send analog information, an analog signal is digitized and embedded in the packets.

Simple control information such as used in X10 systems requires only a relatively low data bandwidth. Transmitters and receivers capable of such a low bandwidth are fairly inexpensive. Increasingly, however, there are other applications where higher bandwidth is necessary. For example, transmitting many types of analog information such as audio and video requires relatively high bandwidths. As another example, it might be desirable to provide a local area network for household computers and other computerized devices using existing power wiring. Higher bandwidths are required for these applications.

Unfortunately, components capable of transmitting at high bandwidths are relatively expensive to produce. This has become an impediment to widespread acceptance and use of any standard that allows high bandwidth communications such as required for audio, video, and computer networking applications.

SUMMARY OF THE INVENTION

The invention includes a home automation system that utilizes a combination of high-bandwidth and low-bandwidth communication protocols over the same household electrical wiring. A system in accordance with the invention might include traditional lower-cost components such as light switches, dimmers, sensors, alarms, switched power outlets, etc. Each of these devices is configured to communicate using a low-bandwidth communications channel established over existing household wiring.

A system in accordance with the invention also includes components having a need for higher-bandwidth communications. These components are configured to use the low-bandwidth communications channel for control information. However, they are also configured to use one of a plurality of high-bandwidth communications channels for high-speed communications with other components. Use of the high-bandwidth channels is managed by communicating over the low-bandwidth communications channel.

As an example, a VCR is configured to receive control commands using the low bandwidth communications channel. Such commands might consist of on-off commands, tape transport commands, and programming commands. The VCR is also configured to transmit an audio/video signal over household electrical wiring using a high-bandwidth communications channel—typically using a higher carrier frequency than the low-bandwidth communications channel.

Similarly, a TV or video monitor is configured to receive control commands using the low bandwidth communications channel, while also being configured to receive the audio/video signal over the high-bandwidth communications channel.

In accordance with the invention, the high-bandwidth channel is selected from a plurality of available high-bandwidth channels that the VCR and TV are capable of using. A controller module is used to set up the VCR and TV to communicate using the same high-bandwidth channel. The controller issues commands to the VCR and TV over the low-bandwidth communications channel, instructing the components which high-bandwidth channel to use. A plurality of different component pairs or sets of components can coexist in the same household by using different high-bandwidth channels.

Once a particular high-bandwidth channel is selected, a pair or group of components can use any desired communications format. For example, an audio or video signal might be modulated directly onto the selected channel using amplitude or frequency modulation. Alternatively, digital data might be modulated onto the channel using traditional modem techniques. There is no need for the high-bandwidth formats to specify addresses or to accommodate general purpose control data. Thus, high-bandwidth formats used between components can be tailored to most efficiently meet the needs of the communicating devices.

DETAILED DESCRIPTION

Figure 1:
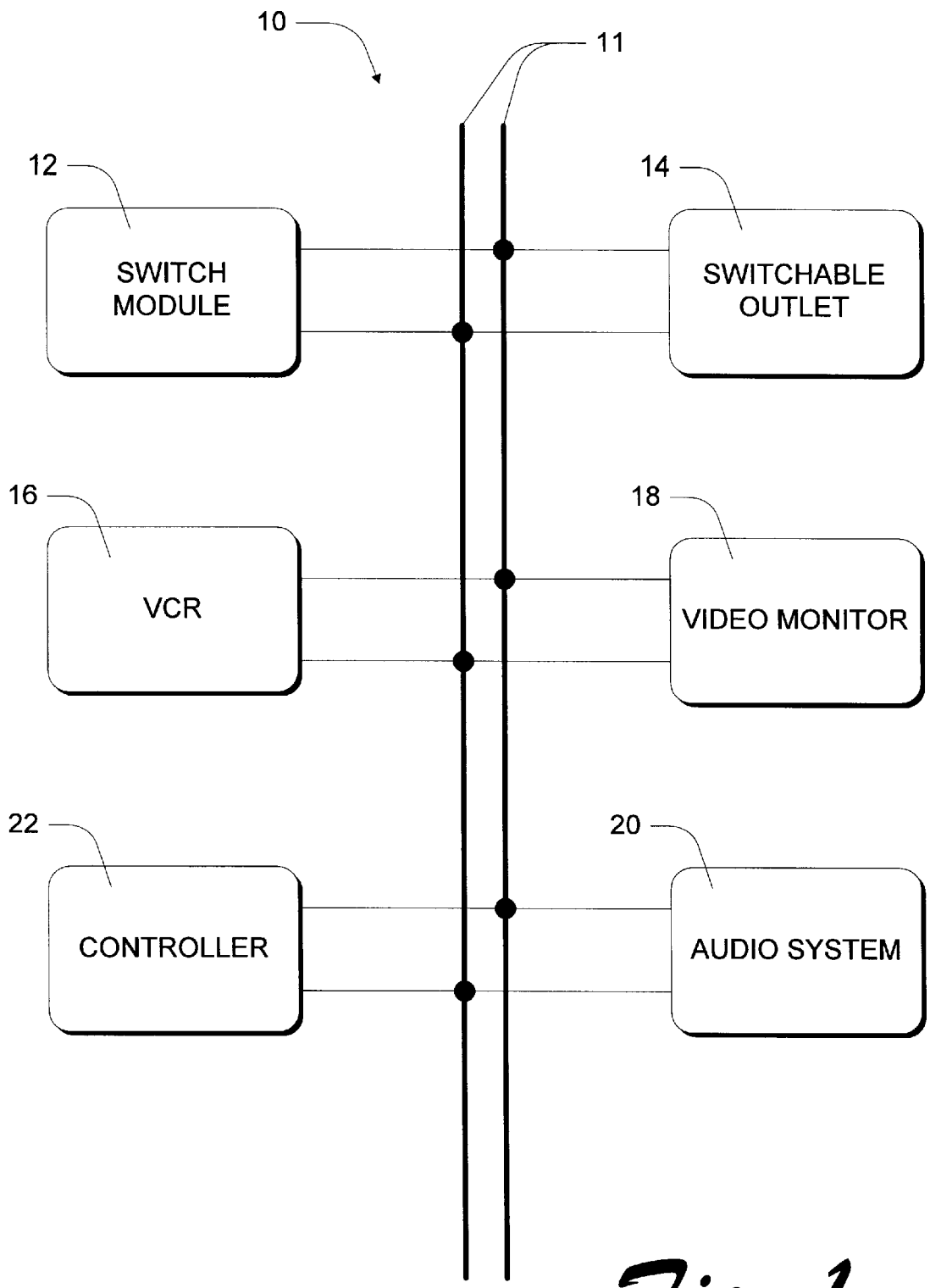
FIG. 1 is a block diagram of a home control system in accordance with the invention.

FIG. 1 shows an example of a home control system 10 that uses electrical power lines 11 for communications. The system comprises a plurality of electrical components that are connected for communications among themselves through the electrical power lines. Such components comprise, for example, a switch module 12, a switchable outlet 14, a VCR (video cassette recorder) 16, a video monitor 18, an audio system 20, and a controller 22. These components have control transmitters and/or control receivers, thus allowing the components to communicate digitally with each other on a low-bandwidth communications channel. Some of the components are also analog signal sources, while others are analog signal receivers. The analog signal sources and receivers communicate using one or more high-bandwidth communications channel. The low-bandwidth channel is preferably at a lower carrier frequency than the high-bandwidth channel.

Figure 2:
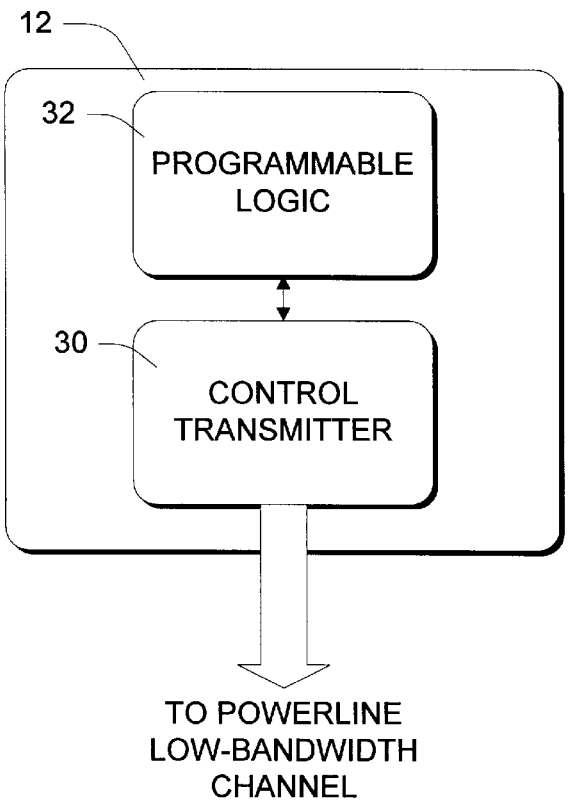
FIG. 2 is a block diagram of a switch module in accordance with the invention.

FIG. 2 shows an example of a simple power control component such as switch module 12. A component such as this has an associated control transmitter 30 that is connected to transmit control data using a low-bandwidth frequency channel on the electrical power lines. This channel allows only a relatively low bandwidth of, for example, 12 kHz or approximately 12,500 bits per second. The low-bandwidth channel uses a carrier frequency of less than approximately 500 KHz. In the described embodiment, the carrier frequency is 300 KHz, and data is modulated on the carrier using 2% frequency modulation. Data is transmitted with a series of marks and spaces, using a format as described in a co-pending U.S. patent application by Gilad Odinak, Nigel Keam, and Craig Ranta, entitled "Bit Encoding in Home Control Systems," filed concurrently with this application, which is hereby incorporated by reference. Actual hardware is implemented using available integrated circuits designed for wireless FM modulation (such as National Semiconductor's LM2893, referred to as a Carrier Current Transceiver). Filtering is implemented to protect against power line surges and noise.

Switch module 12 also has some type of programmable logic 32 such as an inexpensive microprocessor or microcontroller. The programmable logic 32 is connected to supply digital transmission data to control transmitter 30. In response, transmitter 30 modulates the data on the low-bandwidth channel. The particular control data format is described in a co-pending U.S. patent application by Gilad Odinak and Nigel Keam, entitled "Message Formatting, Authentication, and Error Detection in Home Control Systems," filed concurrently with this application, which is hereby incorporated by reference. In this case, switch module 12 transmits simple on/off commands.

Figure 3:
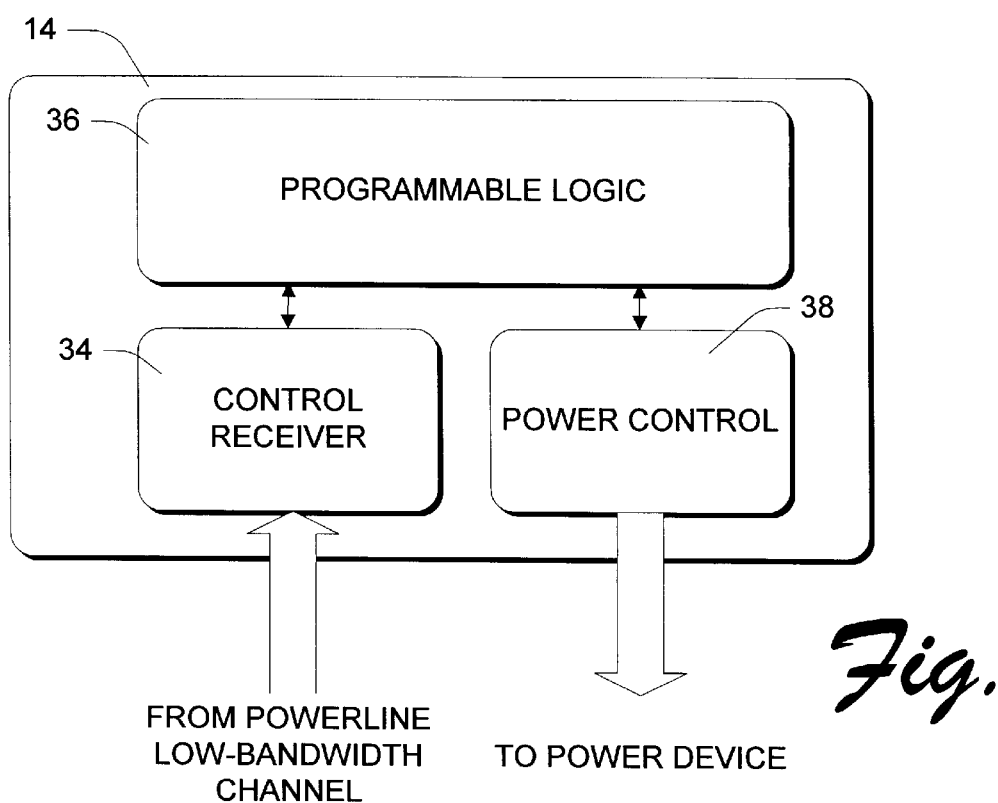
FIG. 3 is a block diagram of a switchable outlet in accordance with the invention.

FIG. 3 shows an example of a simple receiver component such as switchable outlet 14. A component such as this has an associated control receiver 34 that is connected to receive control data using the low-bandwidth frequency channel. Again, the receiver is implemented using conventional circuitry such as commonly used to implement wireless communications systems, with precautions taken to protect against power line surges and noise. Switchable outlet 14 also has programmable logic 36, as well as power control circuitry 38. Data is demodulated from the low-bandwidth channel by receiver 34 and provided to programmable logic 36. Power control circuitry 38 is responsive to programmable logic 36 to selectably provide power to a power outlet or integrated component (not shown). The control data format mentioned above allows an installer to assign virtual circuit numbers to each control component. A receiver is configured to respond only to commands having its virtual circuit number.

Figure 4:
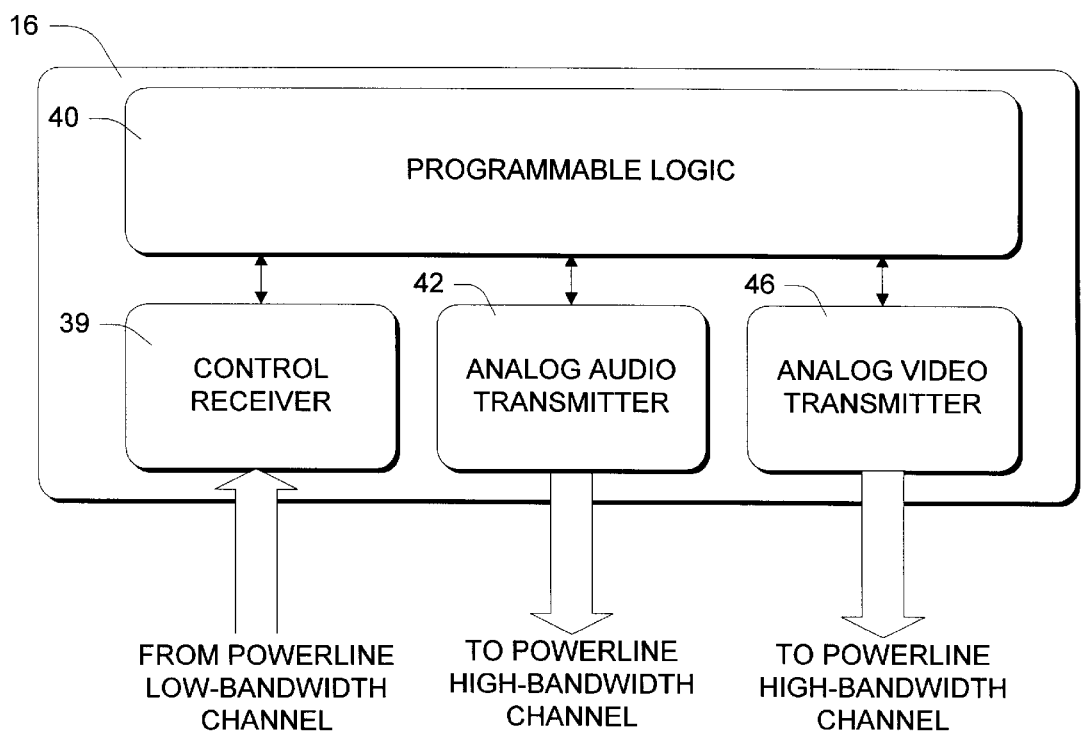
FIG. 4 is a block diagram of a VCR in accordance with the invention.

FIG. 4 shows an example of an analog signal source such as VCR 16. VCR 16 has a control receiver 39 as already described, as well as its own programmable logic 40 that is connected to receive control data from the low-bandwidth communications channel through control receiver 39. In addition, VCR 16 has an associated analog audio signal transmitter 42 for transmitting an analog signal using a high-bandwidth frequency channel on the electrical power lines. This channel allows a relatively high bandwidth of, for example, approximately 36,000 bits per second. The high-bandwidth channel uses a carrier frequency of greater than approximately 3 MHz. In the described embodiment, the carrier frequency is between 3.5 MHz and 4.0 Mhz, divided into twenty high-bandwidth channels of approximately 50 kHz. The analog signal transmitter 42 is tunable or otherwise selectable between any one of the twenty high-bandwidth channels. Specifically, programmable logic 40 controls the channel to which the transmitter is tuned, in response to control data received via control receiver 39.

Again, the transmitter is designed using conventional circuits such as used in wireless FM transmitters. In this case, a raw, non-digitized audio signal is frequency-modulated onto the selected carrier frequency of the selected channel. The audio signal is provided to the audio signal transmitter by playback electronics (not shown) in the VCR.

VCR 16 has a second analog signal transmitter 46 for transmitting a video signal over the power lines using a high-bandwidth channel. Video requires an even higher bandwidth than audio, such as a 6 MHz bandwidth. In the preferred embodiment, the video signal transmitter 46 uses a channel chosen from five available 6 MHz channels having carrier frequencies between 420 MHz and 450 MHz. Again, FM modulation is used.

Figure 5:
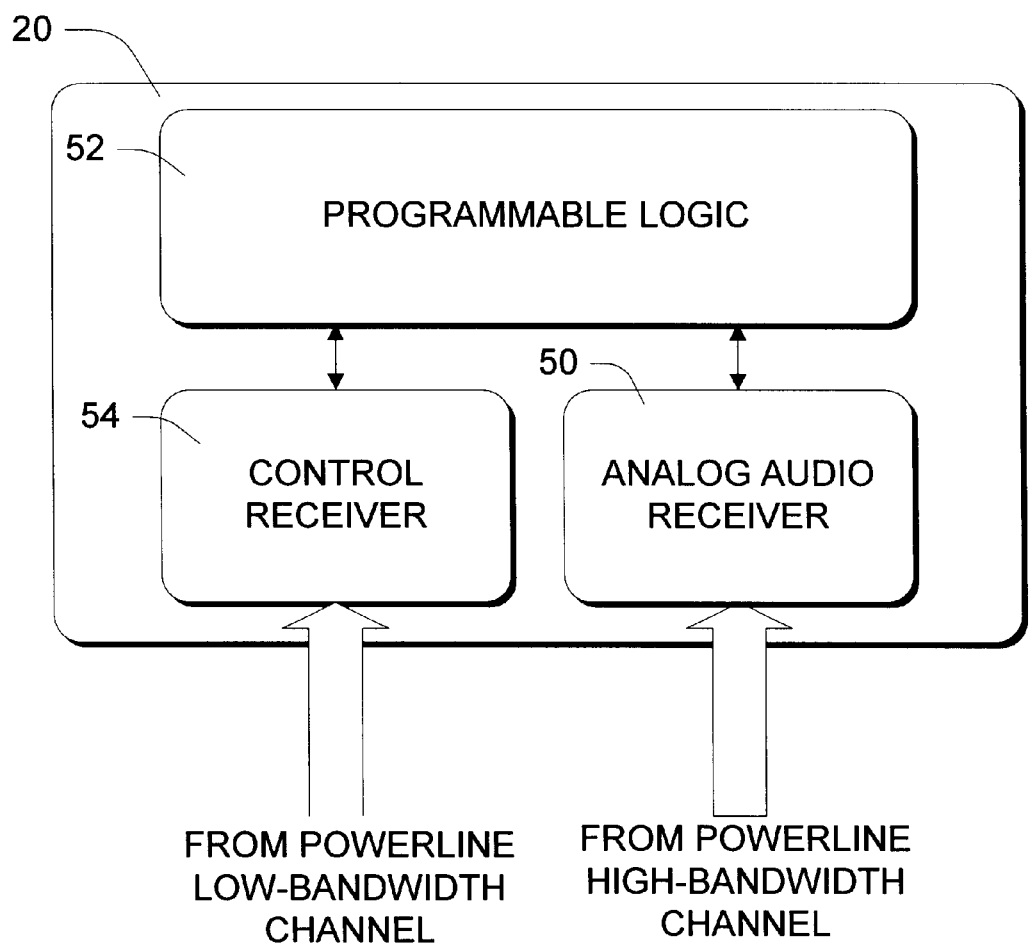
FIG. 5 is a block diagram of an audio system in accordance with the invention.

FIG. 5 shows an example of an analog signal receiving device, in this case audio system 20. Audio system 20 has an audio signal receiver 50 that is connected to receive an audio signal over home electrical wiring. The receiver is an FM demodulator which produces a raw, non-digitized audio signal for amplification by other components (not shown). The receiver is tunable between any of the twenty available high-bandwidth audio channels. Programmable logic 52 is connected to control the operating frequency of receiver 50, again in response to control data received over the low-bandwidth communications channel. Audio system 20 has a control receiver 54 such as already described, which receives and demodulates control data using the low-bandwidth channel, and which provides the demodulated control data to programmable logic 52.

Video monitor 18 has components that are similar to those of audio system 20, for receiving a video signal and providing it to rendering circuits.

Although each electrical component has been described as having a specific set of transmitters and/or receivers, in practice any particular component is equipped with whatever transmitters and receivers are required to carry out the functions of the component. For example, all of the electrical components might have control transmitters to provide bi-directional transfer of control data. However, analog signal transmitters and receivers are provided only in those components specifically requiring them, such as components that have a need to transmit or receive audio/video signals. In this document, the term "audio/video signal" means an analog, non-digitized signal that includes audio information, video information, or both audio and video information.

Furthermore, a typical system has a plurality of components using control transmitters and receivers, and a plurality of components using analog signal transmitters and receivers. All components use the common, low-bandwidth control channels for relatively simple control communications. However, the analog signal sources and receivers use different high-bandwidth analog channels, with correspondingly different carrier frequencies.

The invention has a number of advantages over the prior art. One advantage is that most components can be sold without high-bandwidth components. That is, only more sophisticated components are required to implement the analog signal transmitters and/or receivers. Other components, which have no need for high-speed communications, only need the relatively inexpensive control transmitters and/or receivers. This drastically reduces the cost of a complete system.

Another advantage is that the components using analog signals such as audio and video can be configured, after installation, for specific interconnections between devices, using different ones of the high-bandwidth channels.

This can be accomplished with a controller such as controller 22 of FIG. 1. Controller 22 might consist of a small computer such as a laptop computer, having an associated control transmitter and control receiver to communicate with different electrical components using the low-bandwidth control channel.

Controller 22 is configured to designate groups of analog signal sources and receivers, most likely in conjunction with a human operator. Each group comprises a single signal source and one or more receivers. Once such groups have been designated, the controller transmits control data to each member of the groups, using the low-bandwidth control channel. The control data commands each group to use a different one of the high-bandwidth communication channels. In effect, the controller sets up virtual analog connections between the source and receivers of each group. While the controller is shown as a separate component, it might alternatively be integrated in an analog signal source or receiver. For example, a VCR might include a controller that automatically sets up a virtual analog connection to an available receiver.

In some situations, it might be desirable to transmit and receive digital data at high speeds. Such capability might be useful to implement a local area network within home. If this is the case, a digital data modulator and demodulator are associated and used in conjunction with an analog signal transmitter and receiver as discussed above, respectively. This allows digital data to be transmitted from one component to another on the high-bandwidth analog signal channels. Data rates of approximately 36,000 bits per second can be achieved using the 50 kHz audio channels described above.

Although the invention has been described primarily in terms of its components and features, the invention also includes steps that implement a method of communicating electronically between electrical components, using electrical power lines in a building. Such steps include modulating a first frequency channel on existing electrical power lines for low-bandwidth communications between components, and modulating a second frequency channel on the power lines for high-bandwidth communications between electrical components. The invention further includes transmitting control data between the electrical components on the first frequency channel, and transmitting analog signals between a group of components on the second frequency channel. The analog signals can be audio/video signals, or can include modulated digital content.

The invention further includes designating source/receiver groups or pairs from the components and selecting a particular frequency for the high-bandwidth communications between the source and the receivers of each group. A further step comprises sending control data to each source/receiver group using the first frequency channel. The control data commands the components of each source/receiver group to use the second frequency channel selected for that group. As discussed above, the first frequency channel is at a lower frequency than the second frequency channel. A yet further step comprises modulating digital data on the analog signal transmitted by a particular analog signal transmitter, and demodulating the signal at a receiver.

Although the invention has been described in language more or less specific as to structural and methodological features, it is to be understood that the invention is not necessarily limited to the specific features or steps described. Rather, the specific features and steps are disclosed as preferred forms of implementing the invention.

I claim:

1. A system for electronic communications using electrical power lines in a building, comprising:

a plurality of components that are connected for communications among themselves through the electrical power lines;

a control transmitter associated with at least one of the components for transmitting control data using a low-bandwidth frequency channel on the electrical power lines at a relatively low bandwidth;

a control receiver associated with at least one of the components for receiving control data using the low-bandwidth frequency channel;

an analog signal source associated with at least one of the components for transmitting an analog signal using a high-bandwidth frequency channel on the electrical power lines at a relatively high bandwidth;

an analog signal receiver associated with at least one of the components for receiving the analog signal using the high-bandwidth frequency channel;

wherein the analog signal is a signal other than an electrical power signal.

2. A system as recited in claim 1, wherein the low-bandwidth frequency channel is at a lower frequency than the high-bandwidth frequency channel.

3. A system as recited in claim 1, wherein the low-bandwidth frequency channel is at a frequency of less than approximately 500 KHz and the high-bandwidth frequency channel is at a frequency of greater than approximately 3 MHz.

4. A system as recited in claim 1, further comprising a plurality of the analog signal sources and receivers associated with respective components, the analog signal sources and receivers being configured to transmit and receive analog signals using different high-bandwidth frequency channels.

5. A system as recited in claim 1, further comprising a plurality of the control transmitters and receivers associated with respective components, the control transmitters and receivers being configured to transmit and receive control data using the same low-bandwidth frequency channel.

6. A system as recited in claim 1, further comprising:
a plurality of the control transmitters and receivers associated with respective components, the control transmitters and receivers being configured to transmit and receive control data using the same low-bandwidth frequency channel;
a plurality of the analog signal sources and receivers associated with respective components, the analog signal sources and receivers being configured to transmit and receive analog signals using different high-bandwidth frequency channels.

7. A system as recited in claim 1, wherein the high-bandwidth frequency channel used by the analog signal source and the analog signal receiver is selectable in response to control data transmitted using the low-bandwidth frequency channel.

8. A system as recited in claim 1, wherein the analog signal is an audio/video signal.

9. A system as recited in claim 1, further comprising;
a modulator associated with the analog signal source to modulate digital data on the analog signal;
a demodulator associated with the analog signal receiver to demodulate digital data from the analog signal.

10. A home control system that uses electrical power lines for communications, comprising:
an analog signal source connected to transmit an analog signal using one of a plurality of high-bandwidth frequency channels on the electrical power lines at a relatively high bandwidth, and to receive control data using a low-bandwidth frequency channel on the electrical power lines at a low bandwidth;
an analog signal receiver connected to receive the analog signal using one of the high-bandwidth frequency channels, and to receive control data using the low-bandwidth frequency channel;

at least one controller connected to transmit control data to the analog signal source and to the analog signal receiver using the low-bandwidth frequency channel, wherein the controller sends control data to command the analog signal source and the analog signal receiver to use a particular one of the high-bandwidth frequency channels;

wherein the analog signal is a signal other than an electrical power signal.

11. A system as recited in claim 10, further comprising a plurality of the analog signal sources and receivers, the controller being configured to designate a source/receiver group and to send control data to the group using the low-bandwidth frequency channel, the control data commanding the designated group to use a particular one of the high-bandwidth frequency channels.

12. A system as recited in claim 10, wherein the analog signal is an audio/video signal.

13. A system as recited in claim 10, further comprising:
a modulator associated with the analog signal source to modulate digital data on the analog signal;
a demodulator associated with the analog signal receiver to demodulate digital data from the analog signal.

14. A home control system that uses electrical power lines for communications, comprising:
one or more analog signal sources connected to transmit analog signals using high-bandwidth frequency channels on the electrical power lines at relatively high bandwidths and to receive control data using a low-bandwidth frequency channel on the electrical power lines at a low bandwidth;
one or more analog signal receivers connected to receive the analog signals using the high-bandwidth frequency channels on the electrical power lines and to receive control data using the low-bandwidth frequency channel;
at least one controller that is configured to designate one or more source/receiver groups from the analog signal sources and receivers, the controller being connected to send control data to the source and receiver of each group using the low-bandwidth frequency channel, wherein the control data commands each group to use a different one of the high-bandwidth frequency channels;
wherein the analog signals are signals other than an electrical power signal.

15. A system as recited in claim 14, wherein the controller is integrated with the analog signal source.

16. A system as recited in claim 14, wherein the analog signal is an audio/video signal.

17. A system as recited in claim 14, further comprising:
a modulator associated with one of the analog signal sources to modulate digital data on its analog signal;
a demodulator associated with one of the analog signal receivers to demodulate digital data from its analog signal.

18. A system as recited in claim 14, further comprising a plurality of power components that communicate digitally with each other using the low-bandwidth frequency channel on the electrical power lines.

19. A method of communicating electronically between a plurality of electrical components using electrical power lines in a building, comprising the following steps:
modulating a first frequency channel on the electrical power lines for low-bandwidth communications between electrical components;

modulating a second frequency channel on the electrical power lines for high-bandwidth communications between electrical components.

20. A method as recited in claim 19, wherein the analog signal is an analog audio/video signal.

21. A method as recited in claim 19 wherein the analog signal carries digital content.

22. A method as recited in claim 19, further comprising the following additional steps:

designating a source/receiver group of the electrical components;

selecting a particular frequency for the high-bandwidth communications between the source/receiver group;

sending control data to the source/receiver group using the first frequency channel, the control data commanding the components of the source/receiver group to use the selected particular frequency for the second frequency channel.

23. A method as recited in claim 19, wherein the first frequency channel is at a lower frequency than the second frequency channel.

24. A method of controlling electrical components using electrical power lines in a building, wherein at least one of the components is an analog signal source and at least one of the components is an analog signal receiver, comprising the following steps:

connecting the electrical components to receive control data using a low-bandwidth frequency channel on the electrical power lines at a relatively low bandwidth;

connecting the analog signal source to transmit an analog signal using one of a plurality of high-bandwidth frequency channels on the electrical power lines at a relatively high bandwidth;

connecting the analog signal receiver to receive the analog signal using said one of a plurality of high-bandwidth frequency channels on the electrical power lines;

sending control data to the electrical components using the low-bandwidth frequency channel.

25. A method as recited in claim 24, further comprising the following additional steps:

connecting a controller to send the control data to the electrical components using the low-bandwidth frequency channel;

wherein the sending step includes commanding the analog signal source and the analog signal receiver to use a selected one of the high-bandwidth frequency channels;

transmitting the analog signal from the analog signal source to the analog signal receiver using the selected one of the high-bandwidth frequency channels.

26. A method as recited in claim 24, wherein a plurality of the components are analog signal sources and a plurality of the components are analog signal receivers, the method further comprising the following additional steps:

connecting a controller to send the control data to the electrical components using the low-bandwidth frequency channel;

designating source/receiver groups from the analog signal sources and the analog signal receivers;

wherein the sending step includes commanding the designated groups to use different ones of the high-bandwidth frequency channels.

27. A method as recited in claim 24, wherein the analog signal is an audio/video signal.

28. A method as recited in claim 24, further comprising a step of modulating digital data on the analog signal.

* * * * *